United States Patent [19]

Miner

[11] Patent Number: 4,738,150
[45] Date of Patent: Apr. 19, 1988

[54] COMPACT MANUAL TRANSAXLE TRANSMISSION

[75] Inventor: Hugh L. Miner, Grand Blanc, Mich.

[73] Assignee: Borg-Warner Corporation, Chicago, Ill.

[21] Appl. No.: 406,739

[22] Filed: Aug. 9, 1982

[51] Int. Cl.[4] .............................................. F16H 3/08
[52] U.S. Cl. .......................................... 74/359; 74/357
[58] Field of Search ............................ 74/357, 358, 359

[56] References Cited

U.S. PATENT DOCUMENTS

| Re. 25,458 | 10/1963 | Barth et al. | 74/331 |
|---|---|---|---|
| 2,054,877 | 9/1936 | Eastman | 180/70 |
| 2,306,545 | 12/1942 | Kummich | 74/327 |
| 2,753,728 | 7/1956 | Kelbel | 74/359 |
| 2,869,382 | 1/1959 | Klecker et al. | 74/360 |
| 3,126,752 | 3/1964 | Bolster | 74/359 |
| 3,130,595 | 4/1964 | Cook | 74/331 |
| 3,142,195 | 7/1964 | Henyon | 74/359 |
| 3,163,053 | 12/1964 | Peras | 74/359 |
| 3,309,943 | 3/1967 | Kosman et al. | 74/701 |
| 3,318,167 | 5/1967 | Frost | 74/331 |
| 3,600,963 | 8/1971 | Portmann | 74/360 |
| 4,033,197 | 7/1977 | Shikiya et al. | 74/331 |
| 4,033,200 | 7/1977 | Stockton | 74/740 |
| 4,106,358 | 8/1978 | Morrison | 74/359 X |
| 4,116,082 | 9/1978 | Kelbel | 74/360 |
| 4,152,949 | 5/1979 | Vandervoort et al. | 74/331 |
| 4,174,644 | 11/1979 | Nagy et al. | 74/477 |
| 4,287,791 | 9/1981 | Numazawa et al. | 74/701 |
| 4,377,093 | 3/1983 | Janson | 74/359 X |
| 4,409,858 | 10/1983 | Lasoen | 74/359 X |

FOREIGN PATENT DOCUMENTS 2079877 1/1982 United Kingdom ................. 74/359

*Primary Examiner*—Leslie A. Braun
*Assistant Examiner*—Dwight G. Diehl
*Attorney, Agent, or Firm*—Julian Schachner

[57] ABSTRACT

A compact manual transaxle transmission includes an input shaft with four foward drive gears and a reverse drive gear. Two countershafts drive a differential. The first countershaft supports four forward driven gears and a reverse driven gear. The second countershaft supports another forward driven gear. One of the drive gears is in meshing engagement with driven gears on both countershafts, eliminating the necessity for elongating the input shaft to accommodate an additional gear set. The arrangement minimizes the overall axial length and optimizes the center distance between the input shaft and the second countershaft.

6 Claims, 2 Drawing Sheets

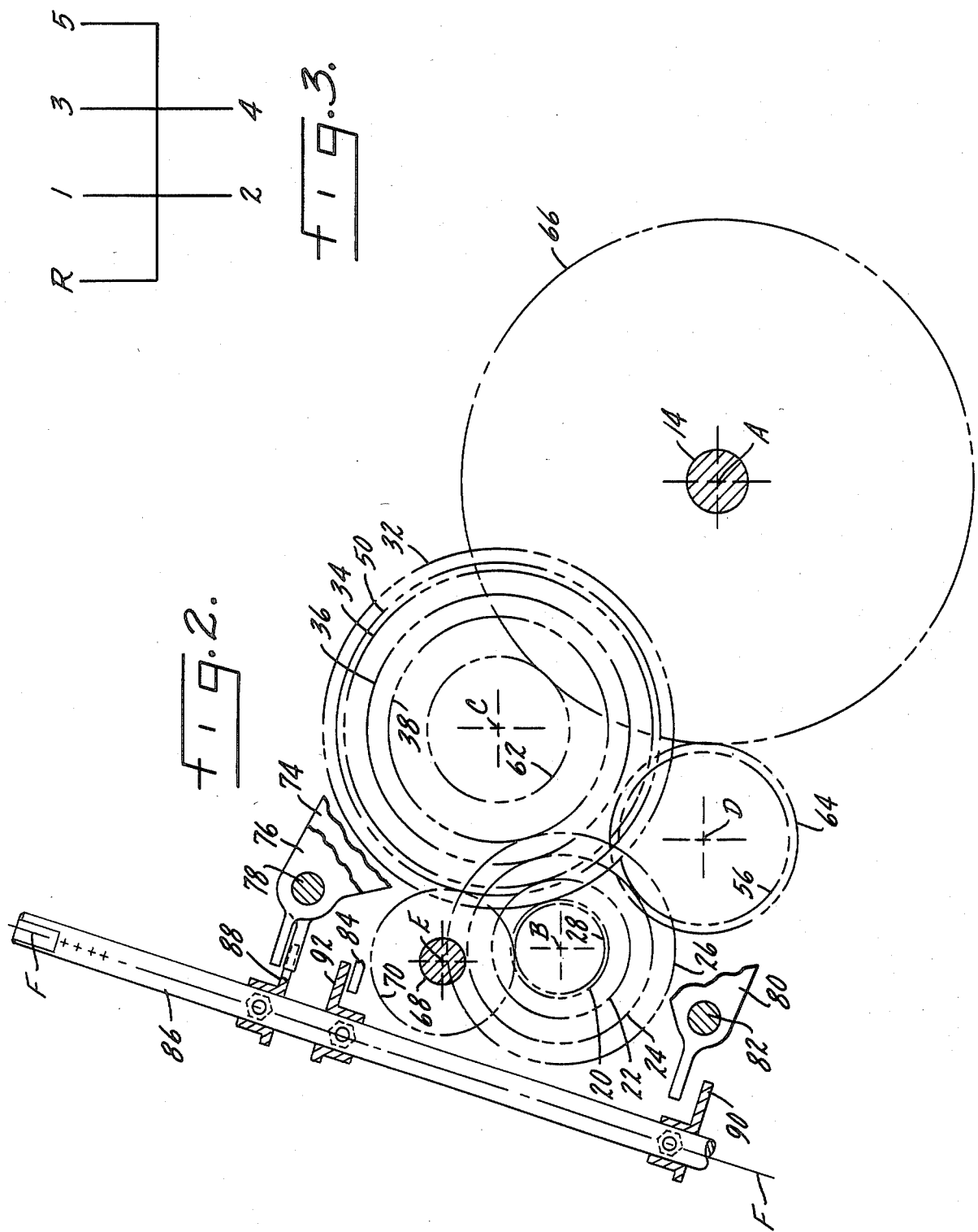

COMPACT MANUAL TRANSAXLE TRANSMISSION

BACKGROUND OF THE INVENTION

This invention relates generally to a transmission adapted for use in an automotive vehicle or the like. More particularly, it relates to a compact manual transaxle transmission especially adapted for use in a modern, downsized, front-wheel-drive vehicle.

In older, rear-wheel-drive vehicles, the axial length of a transmission was not a critical dimension. However, as modern vehicles are downsized and designed for front-wheel drive, the engine and transmission are oriented transversely, and must be enclosed in the space between the front wheels. Thus, the axial length of a transaxle transmission in such an environment is a dimension of primary importance. In such downsized vehicles, the center distances between the various shafts within the transmission also are dimensions of importance.

In addition, it is recognized generally today that the provision of an overdrive speed ratio is an important feature of a transmission. In the typical manual transaxle transmission, it is desirable to provide five forward speed ratios with fifth being an overdrive ratio. An example of such an arrangement is disclosed in U.S. Pat. No. 4,033,200 issued July 5, 1977. This patent discloses a complicated arrangement with the necessity for providing an overrunning clutch in order to obtain overdrive. Another example of such an arrangement is disclosed in U.S. Pat. No. 4,116,082 issued Sept. 26, 1978 and of common assignee herewith. This patent discloses an arrangement in which the axial length of the transmission is longer than desirable in order to provide a fifth, overdrive speed ratio.

There remains a need in the art for a compact manual transaxle transmission which includes an overdrive speed ratio but which both minimizes axial length and optimizes center distances between the various transmission shafts required in the transmission, thereby optimizing the entire transmission housing package.

SUMMARY OF THE INVENTION

The primary object of this invention is to meet the needs noted above. To that end, there is disclosed a compact manual transaxle transmission having an input shaft with four forward drive gears and a reverse drive gear. Two countershafts are provided, both of which drive a differential. The first countershaft includes four forward driven gears and a reverse driven gear. The second countershaft includes another forward driven gear. One of the drive gears is in meshing engagement with driven gears on both countershafts, thus eliminating the necessity for elongating the input shaft to provide an additional gear set. The arrangement is such that the two gears which are driven by the single drive gear are selected so as to optimize the center distance between the input shaft and the second countershaft.

In summary, the invention is directed to a compact manual transaxle transmission including an input shaft, a plurality of drive gears on the input shaft, first and second countershafts, a plurality of driven gears on the first countershaft respectively in meshing engagement with the drive gears for establishing a plurality of gear sets, another driven gear on the second countershaft in meshing engagement with one of the drive gears for establishing another gear set, means for selectively engaging the gear sets, and output means driven by the countershafts.

BRIEF DESCRIPTION OF THE DRAWINGS

The objects and advantages of this invention will become apparent to those skilled in the art upon careful consideration of the specification herein, including the drawings, wherein:

FIG. 2 is a schematic illustration showing details of the arrangement of gears, as well as the shifting mechanism; and FIG. 3 is a diagram showing one of the shift patterns which may be incorporated in the transmission.

Figure 1:
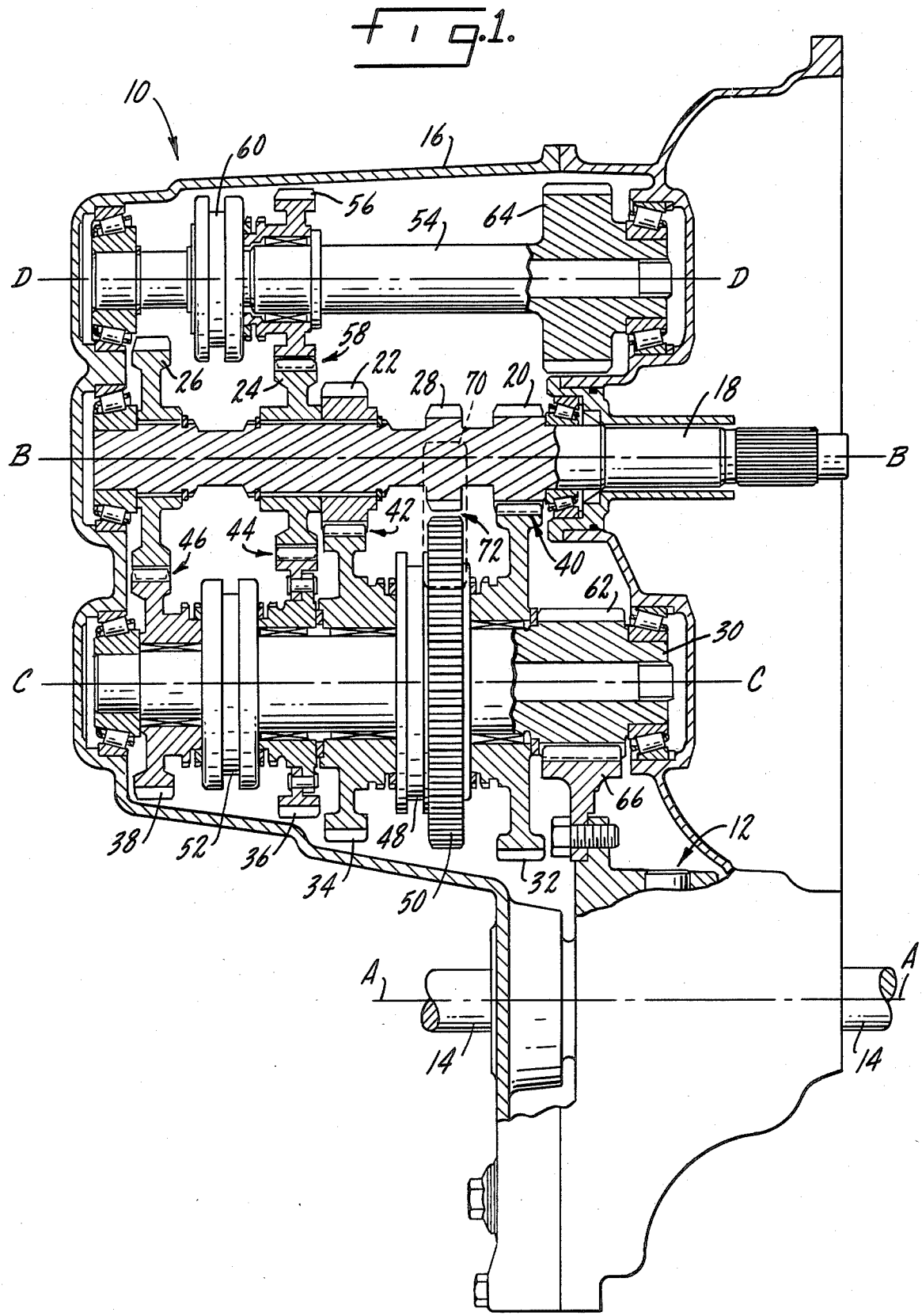
FIG. 1 is an elevational view, partially in section, showing details of the compact manual transaxle transmission.

While this invention is susceptible of embodiment in many different forms, there is shown in the drawings and herein described in detail the preferred embodiment. It should be understood that the present disclosure is considered to be an exemplification of the principles of the invention, and is not intended to limit the invention to this embodiment.

DESCRIPTION OF THE PREFERRED EMBODIMENT

Referring now to the drawings in greater detail, there is shown generally a compact manual transaxle transmission 10 particularly adapted for use in an automotive vehicle incorporating a transversely mounted engine (not shown). Transmission 10 is suitable for transmitting torque from the engine through a differential 12 to a pair of axle shafts 14 rotatable about an axis A.

Transmission 10 includes a housing 16 within which an input shaft 18 is journalled for rotation about an axis B. Input shaft 18 extends from housing 16 and is adapted for driven engagement through a suitable clutch (not shown) with the engine.

First, second, third and fourth forward drive gears 20, 22, 24 and 26 respectively, as well as a reverse drive gear 28, are defined by or secured to input shaft 18 for rotation about axis B.

A first countershaft 30 is journalled in housing 16 for rotation about an axis C. First, second, third and fourth forward driven gears 32, 34, 36 and 38 respectively are journalled on countershaft 30 for rotation about axis C. Gears 20 and 32 together form a first gear set 40 providing a first, low-speed reduction ratio. Gears 22 and 34 together form a second gear set 42 providing a second, intermediate-speed reduction ratio. Gears 24 and 36 together form a third gear set 44 providing a third, intermediate-speed reduction ratio. Gears 26 and 38 together form a fourth gear set 46 providing a fourth, approximately direct drive speed ratio.

A first synchronizer 48 is mounted on countershaft 30 for movement along axis C. Synchronizer 48 is movable in one direction (rightwardly in FIG. 1) for locking gear 32 to countershaft 30. It is movable in the opposite direction (leftwardly) for locking gear 34 to countershaft 30. The sleeve of synchronizer 48 defines a reverse driven gear 50.

A second synchronizer 52 is supported on countershaft 30 for movement along axis C. Synchronizer 52 is movable in one direction (rightwardly) for locking gear 36 to countershaft 30, and is movable in the opposite direction (leftwardly) for locking gear 38 to countershaft 30.

A second countershaft 54 is journalled in housing 16 for rotation about an axis D. A fifth forward driven gear 56 is journalled on countershaft 54 for rotation about axis D. Gears 24 and 56 together form a fifth gear set 58 providing a fifth, overdrive speed ratio.

A third synchronizer 60 is mounted on countershaft 54 for movement along axis D. Synchronizer 60 is movable in one direction (rightwardly) for locking gear 56 to countershaft 54.

Countershafts 30 and 54 respectively define transfer gears 62 and 64, both of which are in driving meshing engagement with a ring gear 66 of differential 12.

A reverse idler shaft 68 is oriented on an axis E (FIG. 2). A reverse idler gear 70 is mounted on shaft 68 for movement along axis E. Gear 70 is movable in one direction (rightwardly in FIG. 1) into meshing engagement with gears 28 and 50. Gears 28, 70 and 50 together form a reverse gear set 72.

The orientation of the various gear sets and synchronizers as disclosed herein simplifies the shift linkage requirements. Shift forks 74 and 76 are slidable on a shift rail 78 (FIG. 2). Shift forks 74 and 76 respectively are adapted for driving engagement with synchronizers 48 and 52. Similarly, a shift fork 80 is slidable on a shift rail 82. Shift fork 80 is adapted for driving engagement with synchronizer 60. A suitable shift member 84 is adapted for driving engagement with reverse idler gear 70.

A shifter shaft 86 is mounted for axial movement along and rotation about an axis F. Suitable actuating arms 88, 90 and 92 are secured to shaft 86. Arm 88 is oriented for movement into and out of alignment with shift forks 74 and 76 upon axial movement of shaft 86. Arm 90 is oriented for movement into and out of alignment with shift fork 80 upon axial movement of shaft 86. Similarly, arm 92 is oriented for movement into and out of alignment with shift member 84 upon axial movement of shaft 86. The orientation is such that for any given axial position of shaft 86, one of arms 88, 90 or 92 is in alignment with one of forks 74, 76 or 80, or with member 84. Thereafter, rotation of shaft 86 about axis F causes movement of one of synchronizers 48, 52 or 60, or of reverse idler gear 70. The result is a simplified shift linkage arrangement which provides the shift pattern illustrated in FIG. 3. Obviously, other shift patterns could be provided by suitable shift linkage arrangements, if desired.

An important advantage of this invention is the use of gear 24 as the drive gear for both third gear set 44 and fifth gear set 58. This eliminates the necessity for an extra drive gear on shaft 18, thus minimizing the overall axial length of transmission 10.

At the same time, the center distance between shafts 18 and 54 is reduced to an optimum degree. This would not be true if, for example, gear 26 rather than gear 24 were used to drive gear 56. In that case, it would be necessary to increase the size of gear 56, and thus the center distance between shafts 18 and 54, in order to obtain the same overdrive ratio. On the other hand, if gear 22 rather than gear 24 were used to drive gear 56, the center distance between shafts 18 and 54 would be such that gears 56 and 34 would clash.

From this discussion, it should be apparent that the arrangement disclosed herein minimizes the axial length of shaft 18 and, in addition, optimizes the center distance between shafts 18 and 54. The overall transmission housing package thus is optimized for use in the restricted space available in modern, front-wheel-drive vehicles.

Another advantage of the arrangement disclosed herein is that the designer has the option of placing synchronizer 60 on either side of gear 56, depending upon the shift pattern and shift linkage assemblies preferred. This would not be the case if, for example, gear 26 were used to drive gear 56. Similarly, the designer has the option of placing reverse idler gear 70 on either side of gears 28 and 50 when reverse is not engaged.

Thus, the compact manual transaxle transmission disclosed herein provides a transmission package of minimum length and optimum breadth. The arrangement allows flexibility to provide various shift patterns with simplified shift linkage, as desired.

It should be understood that while the preferred embodiment of this invention has been shown and described, it is to be considered as illustrative and may be modified by those skilled in the art. It is intended that the claims herein cover all such modifications as may fall within the spirit and scope of the invention.

What is claimed is:

1. A compact manual transaxle transmission comprising an input shaft, a plurality of drive gears on said input shaft, first and second countershafts, a plurality of driven gears on said first countershaft respectively in meshing engagement with said drive gears for establishing a plurality of gear sets, another driven gear on said second countershaft in meshing engagement with one of said drive gears for establishing another gear set, whereby said one drive gear is in meshing relationship with two of said driven gears, synchronizer means for selectively engaging said gear sets, and output means in driven engagement with said first and second countershafts, said plurality of drive gears including first, second, third and fourth forward drive gears, said plurality of driven gears including first, second, third and fourth forward driven gears respectively in meshing engagement with said first, second, third and fourth drive gears for establishing first, second, third and fourth forward gear sets, and said other driven gear being a fifth forward driven gear in meshing relationship with said third drive gear for establishing a fifth forward gear set, said first gear set providing a low-speed ratio, said second and third gear sets providing intermediate-speed ratios, said fourth gear set providing approximately a direct drive speed ratio, and said fifth gear set providing an overdrive speed ratio.

2. The transmission of claim 1, said synchronizer means including a first synchronizer on said first countershaft for selectively engaging said first and second gear sets, a second synchronizer on said first countershaft for selectively engaging said third and fourth gear sets, and a third synchronizer on said second countershaft for engaging said fifth gear set.

3. The transmission of claim 2, said transmission being constructed and arranged such that said first, second and third synchronizers are movable in one direction for respectively engaging said first, third and fifth gear sets, and said first and second synchronizers are movable in the opposite direction for respectively engaging said second and fourth gear sets.

4. The transmission of claim 1, 2 or 3, said output means including a differential adapted for driving engagement with a pair of axle shafts.

5. The transmission of claim 1, 2, or 3, further comprising means for providing a reverse-speed ratio.

6. The transmission of claim 2, or 3, further comprising a reverse gear set providing a reverse-speed ratio, said reverse gear set including a reverse drive gear on said input shaft, a reverse driven gear on said first synchronizer, and a reverse idler gear movable in said one direction into meshing engagement therewith.

* * * * *